April 27, 1926.
F. P. WALTERS
OPTICAL DISPLAY DEVICE
Filed June 8, 1925  2 Sheets-Sheet 1.
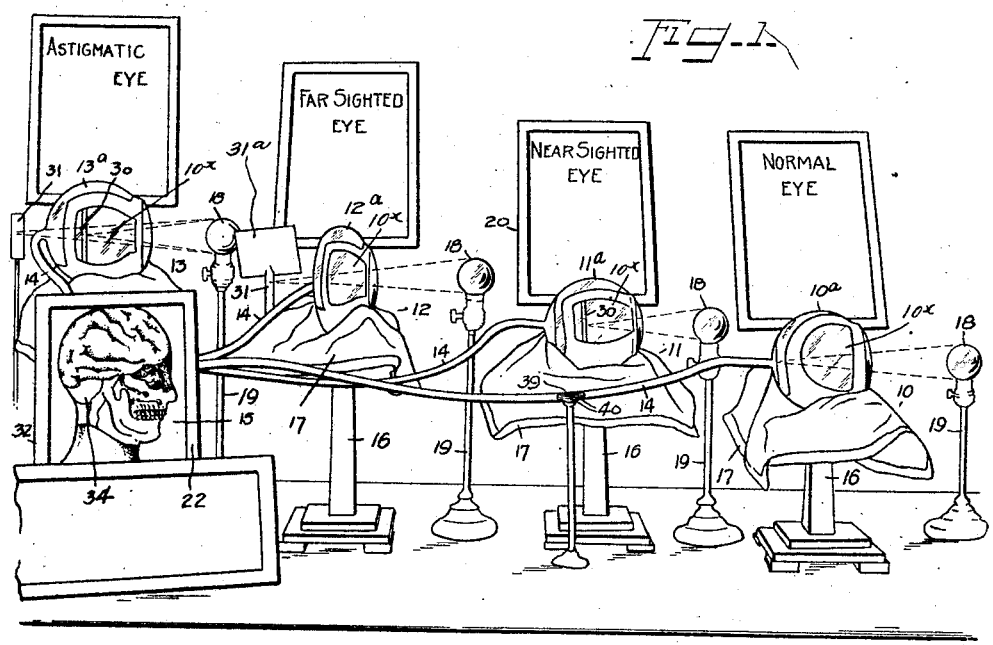
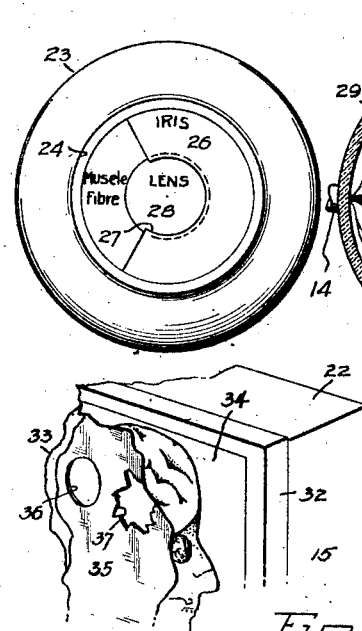
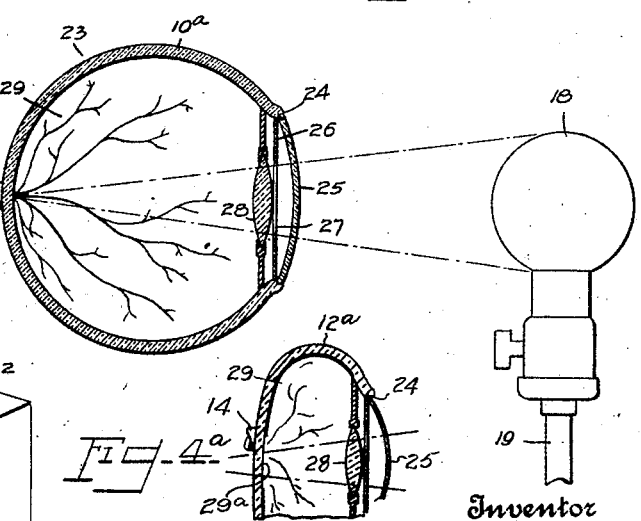
Inventor
Frank P. Walters
By his Attorney

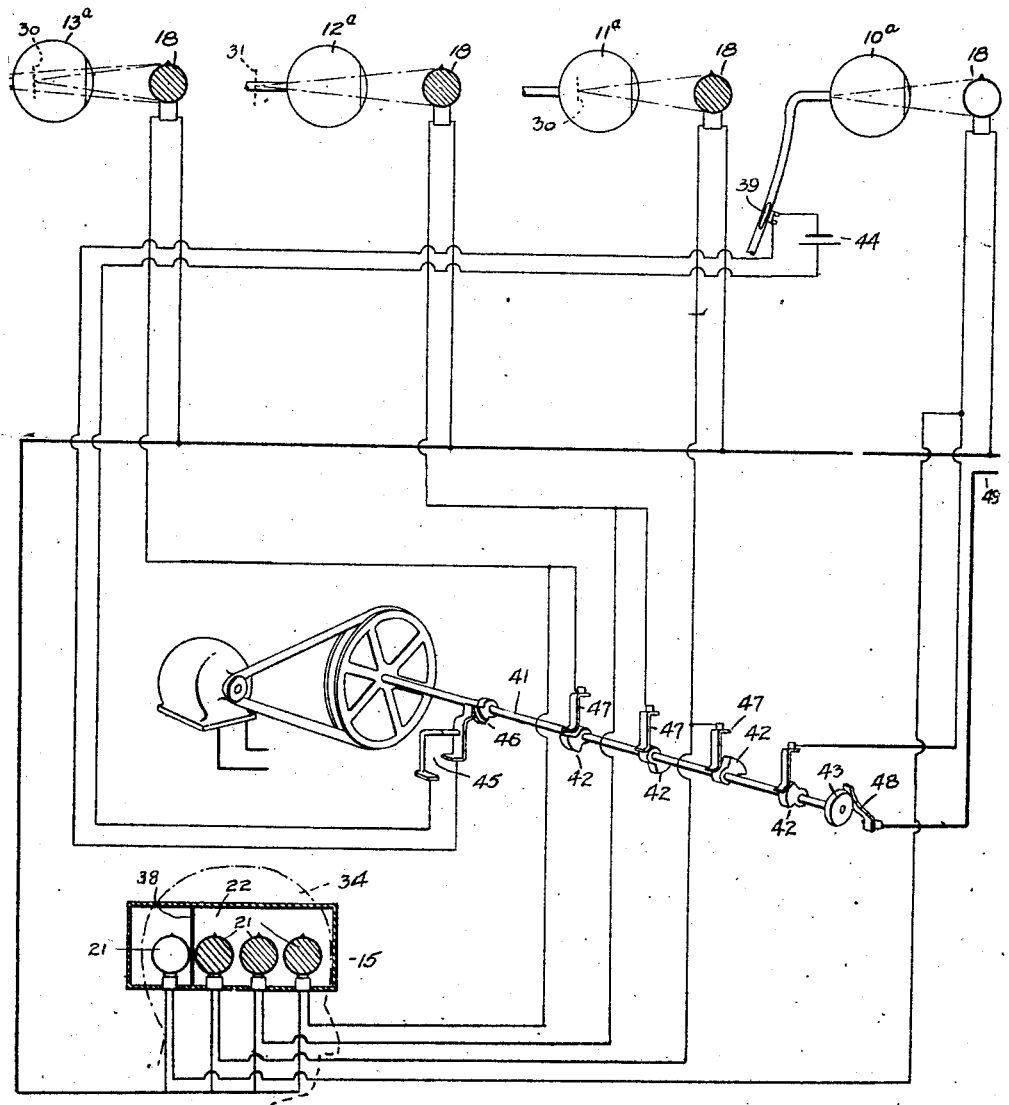

Patented Apr. 27, 1926.

1,582,199

UNITED STATES PATENT OFFICE.

FRANK P. WALTERS, OF BROOKLYN, NEW YORK.

OPTICAL DISPLAY DEVICE.

Application filed June 8, 1925. Serial No. 35,512.

*To all whom it may concern:*

Be it known that I, FRANK P. WALTERS, a citizen of the United States of America, residing at Brooklyn, county of Kings, and State of New York, have invented new and useful Improvements in Optical Display Devices, of which the following is a specification.

The present invention relates to an optical display device or system, and is designed primarily to faithfully illustrate, mechanically, the phenomena which occur in the human system in the transmission of light from the normal and the various types of malformed eyes to the brain. Systems of this kind are advantageously usable as advertising displays and in the instruction of medical students.

A device or system, according to my invention includes a series of simulated human eyeballs one of which is normal and others of which illustrate the more commonly found malformations, a suitable object such as a light source adjacent each eye, a representation of the human brain with connections thereto from the several eyeballs, means to control the lighting and extinguishing of the light sources and means in the brain representation to give suitable indications of the effect of transmission of light from the several eyeballs.

By use of a system of this character striking ocular illustration of the entire process of light transmission from the eye to the brain, and the precise effect on the latter may be given in a manner to make clear a subject generally considered as being rather abstruse.

I am aware that it is common practice to employ representations of the human eye to illustrate the various defects of vision, to illuminate such eyes and to provide means for showing how the defects of vision may be corrected, but I believe that I am the first to devise a system or arrangement of instrumentalities in which the effect of light transmission from the normal eye and the several kinds of malformed eyes is visibly portrayed on the representation of a human brain.

One embodiment of my invention is illustratively exemplified in the accompanying drawings in which, Figure 1 is a perspective view of my invention; Figure 2 is a front elevational view of a simulated eye ball used in the display; Figure 3 is a longitudinal sectional view of the eye ball; Figure 4 is a perspective view of a corner of the brain picture and associated dark box; Fig. 4$^a$ is a fragmentary view of the simulated far sighted eyeball shown in Fig. 1, and Figure 5 is a diagrammatic view of the electrical controlling mechanism for the lights.

Referring to the drawings, 10, 11, 12 and 13 designate a series of stations at which are, respectively, a complete representation of the normal eye ball, near sighted eye ball, far sighted eye ball, and astigmatic eye ball. Each eye ball is provided with a tubular connection 14, representing its optic nerve, which is attached to the blind spot of the eye ball and extends in a serpentine curve to the rear of a frame in which a picture 15 of the human brain is displayed. Included at each station is an eye ball, as for example, the near sighted eye ball 11$^a$; a supporting pedestal 16 over which may be draped a cover 17 to receive the ball, an electric filament lamp 18 supported on a suitable fixture 19, the elevation of the lamp bringing the filament in the axis of the eye ball; and a frame 20 suspended on an adjacent wall, preferably in back of and above the eye ball, and including a full description of the theory of near sightedness, and the necessary corrective measures. Each lamp 18 is in circuit with a corresponding lamp 21 arranged in a dark box 22 disposed at the rear of the brain picture 15, the system of lamps being controlled by a controlling mechanism for alternating their illumination, as hereinafter described.

Each exhibit, in so far as the eye ball and the defective condition represented are concerned, will now be described in detail but it will be clear that the particular arrangement of the defective eye balls is immaterial and the arrangement shown in the drawing is merely one of many suggestions for a display of this character.

Each eye ball in general, comprises a transparent more or less globular member 23 corresponding to the outer sclerotic coat which is provided with a front opening 24 closed by a curved crystal or cornea 25. Behind the cornea 25 is a diaphragm 26 which corresponds to the colored part or iris of the eye. The circular opening 27 in the iris is the pupil. Supported from the wall of the member 23, just back of the iris 26 is a transparent lens 28 dividing the eye into two chambers, the anterior chamber between the lens 28 and cornea 25, and the interior chamber, between the lens and the wall of the globular member 23. The globular wall of the interior chamber is provided with an opaque coating 29 to indicate the retina, a membrane traversed by a network of nerves branching from the optic nerve, represented by the connection 14. The interior chamber may be filled with liquid or any other substance capable of clearly defining light rays reflected therethrough.

The normal eye ball $10^a$ which like each of the others has a window $10^x$ represents an eye, which in its passive or relaxed condition focuses parallel rays on the retina 29.

The defects of most frequent occurrence are near sightedness far sightedness and astigmatism. If the relaxed eye focuses parallel rays in front of the retina 29, it is near sighted, a condition which is indicated at the second station or exhibit. The globular member $11^a$ is provided with a partition 30 placed in front of the retina 29 and any light rays entering the interior chamber through the cornea focus on this partition. This defect is caused by the abnormal length of the eye ball from front to back and is too great for the focal length of the lens. The correction consists in placing in front of the eye a diverging lens (not shown) that makes the lens of the eye a less convergent system than the lens 28 itself. If the focal length of the diverging lens is equal to the greatest distance of distinct vision for the near sighted eye, and if this lens is held close to the eye, parallel rays from a distant object will enter the eye as if they came from the principal focus of the lens, the image falls on the retina and vision is made distinct.

If the relaxed eye focuses parallel rays from distant objects on the sclerotic coat instead of on the retina, it is far sighted. The eye ball is then too short to correspond to the focal length of the lens 28. This condition of the eye ball is reproduced by making the minor axis of the globular member $12^a$ substantially shorter than its major axis. To illustrate, in a somewhat exaggerated form, the action of a far sighted eye when focusing light rays, I show at the far sighted eye station in Fig. 1 the light rays emanating from the lamp 18 as passing through the eye ball $12^a$ and focusing on the plane or rod 31 which rises from the adjacent pedestal 16. The rod 31 may hold, at its upper end, a card $31^a$ having explanatory matter (not shown) thereon. To permit the light rays from the lamp 18 to pass through eye ball $12^a$ to the plane 31, I leave a minute part, $29^a$, of the retina 29 of eye ball $12^a$ transparent, as shown in Fig. $4^a$, and the light rays may pass through this transparent portion and focus on the plane 31. Correction for far sightedness is effected by placing a converging lens (not shown) in front of the eye, thereby making with the lens 28 of the eye a more converging system than the eye lens alone. Light rays from a near object then enter the eye as if they came from a distant one and vision becomes distinct.

Sometimes the front of the cornea has different curvatures in different planes through the axis, i. e. it has a somewhat cylindrical form. A condition of this kind is represented at the fourth station in which the member $13^a$ is designed to show the condition of an astigmatic eye or one which has no fixed focus. The eye ball $13^a$ is provided with both the interior partition 30 and exterior plane 31 and light rays passing into the eye focus on both points. Astigmatism is corrected by the use of a lens (not shown) one surface of which at least is not spherical but differs from it in the opposite sense to that of the defective eye.

It is well known that impressions focused on the retina photograph on the brain and the sharpness of such impressions determines the detail of the photograph. Broadly stated, defective vision diffuses the photograph made on the brain. In order to clearly illustrate this condition I provide a system of lights 18 for each station of my exhibit and a corresponding system of lights 21 for the dark box 22 behind the brain picture 15.

The brain picture 15 illustrated in Figure 4, comprises a frame 32, glass front 33, superposed brain picture print 34, and a mat 35 interposed between the print 34 and glass 33. The mat is an opaque sheet of material having two openings, one thereof arranged behind a portion of the brain and having a clear cut preferably round opening 36, while the other is cut to provide an irregular opening 37 which is disposed at the side of the first opening and registering with another portion of the brain. The dark box 22 behind the picture is divided into two compartments by a partition 38 which separates the light associated with the normal eye ball light from the other three. The compartments are so arranged that when the normal eye ball light glows the opening 36 will permit a clear disc of light to appear on the brain picture 15 while alternate illumination of any of the other lights will permit an irregularly shaped area of light to appear on the brain surface.

In order to produce a realistic showing of the optic nerves, I have cut away a portion of the tube of the normal eye ball $10^a$, and inserted therein a small lamp 39 the opening in tube 14 being covered with small threads 40 which produce the effect of a network of nerve fibres running through the optic nerve. The lamp 39 is arranged to glow simultaneously with the illumination of the normal eye ball lamps.

The controlling mechanism for alternating the illumination of each pair of lights in the system and for causing the optic nerve lamp 39 to glow is illustrated in Figure 5 and comprises a motor driven shaft 41 having a series of cam shoes 42 and a contact disc 43 fixed thereon. Each shoe is substantially one quarter segment and arranged on the shaft 41 to occupy a different segment of the same circle. The optic nerve lamp 39 is preferably a low voltage lamp and receives its energy from a battery 44 which is connected to the lamp by a make and break circuit line 45. The line 45 is operated by a cam shoe 46 fixed to the shaft 41 and arranged so as to close the circuit simultaneously with the operation of the normal eye ball lamp system. A plurality of brushes 47 are arranged to bring their contacting surfaces in paths through which the shoes 42 revolve, whereby one shoe follows another to make contact with their respective brush. A brush 48 is held constantly in contact with the disc 43 and conducts current from a main trunk line 49 to the shaft 41 and cam shoes 42, where it is carried through the brushes 47 to respective lamps in both systems; i. e. the lamps in front of the eye balls and the corresponding lamps in the dark box 22.

The operation of the display is as follows: As light is transmitted through one of the eyes, the electric bulb 21, in the brain picture 15, which corresponds to the illuminated eye will be lighted. If the light is transmitted through the normal eye 10ª a clear bright illumined spot will show through the opening 36 in the brain picture 15, while if light is transmitted through any one of the defective eyes 11ª 12ª or 13ª a somewhat blurred, irregular illumination will appear at the opening 37.

I claim:

1. An optical display device comprising the representation of a human eye, means for illuminating the same the representation of a human brain, a connection between the eye and the brain, and means for indicating on the brain representation the effect of illumination of the eye.

2. An optical display device comprising a plurality of stations, a representation of a normal human eye at one station and a representation of a malformed human eye at each of the other stations, means for illuminating the several eyes a representation of a human brain, connections from the several eyes to the brain representation, and means for presenting at the brain an indication to represent the effect of illumination of the normal eye and a different indication to represent the effect of illumination of any of the malformed eyes.

3. An optical display device comprising a plurality of stations, a representation of a normal human eye at one station and a representation of a malformed human eye at each of the other stations, means for illuminating the several eyes connections from the several eyes to the brain representation, and means for showing at the brain representation a clear illumination when the normal eye is illuminated and a less clear illumination when one of the malformed eyes is illuminated.

4. A display device of the character described, comprising a plurality of stations, each thereof having a representation of the human eye ball and a source of light associated therewith, a representation of a human brain remote from said stations, and electric means for alternately illuminating the sources of light for the eye balls and for causing illuminated areas to appear on said brain picture one of said areas representing the effect of illumination of a normal human eye and another area representing the effect of illumination of a malformed human eye.

5. A display device of the character described comprising a plurality of stations, representations of the human eye ball in normal and abnormal conditions at the stations, a separate source of light adapted to project rays through each eye ball, an optic nerve representation connected to each ball, a brain picture remote from said stations and being the terminus for said optic nerves, sources of light in the brain picture corresponding respectively to the light sources of the eye balls, and electrical controlling means for connecting and alternately lighting said corresponding lights.

6. An optical display device comprising a plurality of stations, a representation of a human eye at each station, a source of light adjacent each eye, a representation of a human brain, connections from the several eyes to the brain representation, a source of light adjacent the brain representation, and means for alternately illuminating the several eyes and for illuminating the brain representation concurrently with each eye illumination.

7. An optical display device comprising a plurality of stations, a representation of a human eye at each station, a source of light adjacent each eye, a representation of a human brain, connections from the several eyes to the brain representation, a source of light adjacent the brain representation, light transmitting means differing in appearance adjacent the last mentioned source of light, and means for causing the sources of light adjacent the eyes to glow alternately and the source of light adjacent the brain representation to glow concurrently with each eye illumination.

8. An optical display device comprising a plurality of stations, a representation of a human eye at each station, a source of light adjacent each eye, a representation of a human brain, a source of light adjacent the brain representation, connections from the several eyes to the brain representation, a source of light in at least one of said connections, and means for controlling the operation of the several sources of light.

In testimony whereof I affix my signature.

FRANK P. WALTERS.